(12) United States Patent
Steen

(10) Patent No.: US 9,955,630 B2
(45) Date of Patent: May 1, 2018

(54) AGRICULTURAL HARVESTER STORAGE TANK COVER

(71) Applicant: CNH Industrial America LLC, New Holland, PA (US)

(72) Inventor: Pieter M. I. Steen, Ypres (BE)

(73) Assignee: CNH Industrial America LLC, New Holland, PA (US)

( * ) Notice: Subject to any disclaimer, the term of this patent is extended or adjusted under 35 U.S.C. 154(b) by 3 days.

(21) Appl. No.: 15/155,383

(22) Filed: May 16, 2016

(65) Prior Publication Data

US 2016/0338269 A1  Nov. 24, 2016

(30) Foreign Application Priority Data

May 19, 2015  (BE) .................................. 2015/5307

(51) Int. Cl.
| | |
|---|---|
| *A01F 12/60* | (2006.01) |
| *A01D 41/12* | (2006.01) |
| *B60P 1/28* | (2006.01) |
| *B65D 88/12* | (2006.01) |
| *B65D 90/02* | (2006.01) |
| *B65D 90/10* | (2006.01) |

(Continued)

(52) U.S. Cl.
CPC .......... *A01F 12/60* (2013.01); *A01D 41/1208* (2013.01); *A01D 41/1226* (2013.01); *B60P 1/286* (2013.01); *B65D 88/12* (2013.01); *B65D 90/02* (2013.01); *B65D 90/10* (2013.01); *A01D 90/10* (2013.01); *A01F 12/46* (2013.01)

(58) Field of Classification Search
CPC ............ A01D 41/1226; A01D 41/1208; B65D 88/005; B65D 88/123; B65D 88/126; B65D 88/125; A01C 15/005
USPC ....................................... 460/119, 23; 296/15
See application file for complete search history.

(56) References Cited

U.S. PATENT DOCUMENTS

| | | | | |
|---|---|---|---|---|
| 4,106,649 | A | * | 8/1978 | Nelson ................ A01D 41/1226 414/293 |
| 4,466,549 | A | * | 8/1984 | Hanaway ........... A01D 41/1226 220/4.03 |

(Continued)

FOREIGN PATENT DOCUMENTS

| | | |
|---|---|---|
| DE | 2458571 A1 | 6/1976 |
| DE | 4320565 A1 | 1/1995 |

(Continued)

*Primary Examiner* — Arpad Fabian-Kovacs
(74) *Attorney, Agent, or Firm* — Peter K. Zacharias; Patrick M. Sheldrake

(57) ABSTRACT

An agricultural harvester including a storage tank that includes a tank body and a tank cover assembly. The tank cover assembly has a travel state and an operational state. The tank cover includes a fabric wall element which is moveably connected to the tank body. In the operational state, the fabric wall element provides an upward extension of at least a part of the circumferential wall. In the travel state, the fabric wall element covers at least a part of the open top of the tank body. The fabric wall element includes a rigid area. The cover actuator assembly includes at least one cover actuator that is adapted to bring the tank cover assembly from the travel state into the operational state and vice versa, and to engage the fabric wall element at the rigid area.

20 Claims, 5 Drawing Sheets

(51) Int. Cl.
*A01D 90/10* (2006.01)
*A01F 12/46* (2006.01)

(56) References Cited

U.S. PATENT DOCUMENTS

| | | | |
|---|---|---|---|
| 5,151,064 A * | 9/1992 | Damman | A01D 41/1226 460/119 |
| 5,427,572 A | 6/1995 | Deutsch et al. | |
| 6,074,298 A * | 6/2000 | Majkrzak | A01D 41/1226 460/119 |
| 6,206,779 B1 * | 3/2001 | Gerber | A01C 15/005 414/502 |
| 6,508,705 B1 * | 1/2003 | Van Overschelde | A01D 41/1226 296/15 |
| 6,692,352 B2 | 2/2004 | Gerber et al. | |
| 6,752,715 B2 | 6/2004 | Stephens et al. | |
| 7,101,280 B2 * | 9/2006 | Colpaert | A01D 41/1208 460/119 |
| 7,585,214 B1 | 9/2009 | Johnson et al. | |
| 7,918,720 B2 | 4/2011 | Mohr et al. | |
| 8,029,346 B2 | 10/2011 | Sprau | |
| 8,113,565 B2 | 2/2012 | Zeuner et al. | |
| 8,146,974 B2 | 4/2012 | Horst | |
| 8,944,898 B2 | 2/2015 | Barnes et al. | |
| 2003/0078085 A1 * | 4/2003 | Gerber | A01D 41/1226 460/119 |
| 2003/0232634 A1 * | 12/2003 | Johnson | A01D 41/1226 460/119 |
| 2004/0033823 A1 * | 2/2004 | Stephens | B60J 7/102 460/119 |
| 2008/0261672 A1 * | 10/2008 | Stukenholtz | A01D 41/1226 460/119 |
| 2009/0215509 A1 * | 8/2009 | Johnson | A01D 41/1226 460/23 |
| 2009/0270149 A1 * | 10/2009 | Sprau | A01D 41/1226 460/119 |
| 2011/0095554 A1 * | 4/2011 | Zeuner | A01D 41/1226 296/15 |
| 2012/0155996 A1 * | 6/2012 | Horst | A01D 41/1226 414/293 |
| 2013/0196724 A1 * | 8/2013 | Barnes | A01D 41/1226 460/119 |
| 2013/0196725 A1 | 8/2013 | Bossuyt et al. | |
| 2013/0252681 A1 * | 9/2013 | Cooksey | A01D 41/1226 460/119 |
| 2013/0296005 A1 * | 11/2013 | Claes | A01D 41/1226 460/119 |
| 2015/0148112 A1 * | 5/2015 | Ducroquet | A01D 41/1226 460/119 |
| 2015/0272000 A1 * | 10/2015 | Claes | A01D 41/00 56/473.5 |

FOREIGN PATENT DOCUMENTS

| | | |
|---|---|---|
| DE | 102007054277 A1 | 5/2009 |
| EP | 1197134 A1 | 4/2002 |
| EP | 2149288 A1 | 2/2010 |
| FR | 2082260 | 12/1971 |

* cited by examiner

AGRICULTURAL HARVESTER STORAGE TANK COVER

CROSS REFERENCE TO RELATED APPLICATION

This application claims priority to Belgium Application 2015/5307, filed May 19, 2015, the contents of which are incorporated herein by reference.

FIELD OF THE INVENTION

The invention pertains to an agricultural harvester comprising a storage tank for accommodating harvested crop.

BACKGROUND OF THE INVENTION

US2003/0078085 discloses a grain tank cover used in a harvesting device such as a combine harvester. This known grain tank cover comprises four rigid cover panels that are moveably connected around the circumference of the top edge of the grain tank. When the rigid cover panels are in a substantially horizontal position, they together cover the top of the grain tank. Usually, they are in this position when the harvester travels from one harvesting site to the next. An actuator assembly can move the rigid cover panels from the horizontal position into a more upright position, in which the rigid cover panels form an upward extension of the walls of the grain tank.

Between adjacent rigid cover panels, a flexible transition panel is present. When the rigid cover panels are in a horizontal position covering the top of the grain tank, the flexible transition panels are disposed inside the tank, drooping downwardly from the side edges of the rigid cover panels. So, the flexible transition panels do not cover the top of the grain tank when the cover panels are in their horizontal position. When the rigid cover panels are raised, the flexible transition panels rise with the rigid cover panels and extend across the otherwise open spaces between the side edges of the rigid cover panels. By closing these open spaces, the space between the rigid cover panels when they are in the upright position can be used to accommodate an additional amount of harvested crop.

The rigid cover panels have to be strong in order to withstand the mechanical load exerted on them by the harvested crop that is accommodated between them when they are in the upright position. This load can be particularly high when the harvester device is on a sloped surface. This results in the rigid cover panels being heavy and contributes significantly to the total weight of the harvester device, even when as proposed in US2003/0078085 the rigid cover panels are made of plastics. The total weight of a harvester device is of concern, for example, because excessive weight can cause an undesired amount of compacting of the soil and because there are weight limits to vehicles that are allowed on public roads.

SUMMARY OF THE INVENTION

In accordance with an aspect of the present invention, there is provided an improved agricultural harvester. The agricultural harvester comprises a storage tank which is adapted to accommodate harvested crop. The storage tank comprises a tank body having a bottom, an open top, and a circumferential wall having a top edge that delimits said open top. The circumferential wall comprises a front wall part, a rear wall part, and two side wall parts, which side wall parts are located on opposite sides of the circumferential wall. The storage tank further comprises a tank cover assembly, which has a travel state and an operational state. In the travel state the tank cover assembly is adapted to cover the open top of the tank body, and in the operational state the tank cover assembly is adapted to provide an upward extension of the circumferential wall of the tank body. The tank cover assembly comprises a panel assembly and a cover actuator assembly. The panel assembly extends along the top edge of the circumferential wall of the tank body and comprises a fabric wall element which is moveably connected to the tank. In the operational state, the fabric wall element provides an upward extension of at least one of the front wall part, rear wall part, and/or the side wall parts of the circumferential wall of the tank body. In the travel state, the fabric wall element covers at least a part of the open top of the tank body. The fabric wall element comprises a rigid area. The cover actuator assembly comprises at least one cover actuator that is adapted to bring the tank cover assembly from the travel state into the operational state and vice versa, wherein the cover actuator assembly is adapted to move the fabric wall element relative to the tank body during the movement from the travel state into the operational state and vice versa and, at least during said movement, to engage said fabric wall element at the rigid area.

In accordance with another aspect of the present invention, there is provided an agricultural harvester, which is, for example, a combine harvester, and which comprises a storage tank. In this storage tank, harvested crop (e.g. grain, corn, or seed) can be accumulated during the harvesting process. The storage tank is generally intermittently emptied.

The storage tank comprises a tank body and a tank cover assembly. The tank body has a bottom, an open top, and a circumferential wall. The circumferential wall has a top edge that delimits the open top and comprises a front wall part, a rear wall part, and two side wall parts. The top edge will generally be a free edge, but in the alternative it is possible that an additional wall part extends above the top edge. This additional wall part will however in general not be used to keep crop in the tank body. The side wall parts are located on opposite sides of the circumferential wall. Seen from above, the tank body can for example have a rectangular shape, with relatively sharp corners between the front wall part and the side wall parts and between the rear wall part and the side wall parts. The tank body can alternatively have a round, rounded, or elliptical shape when seen from above. In those cases, the transition between the front wall part and the side wall parts and between the rear wall part and the side wall parts are more gradual and/or more rounded.

Optionally, the tank body comprises a crop inlet, which is for example an opening which is for example arranged in the bottom or in the circumferential wall. Harvested crop enters the storage tank via the crop inlet. Optionally, the agricultural harvester further comprises a crop storage feed device which is adapted to actively bring the harvested crop into the storage tank. The crop storage feed device can be for example a bubble-up auger.

The tank cover assembly has a travel state and an operational state. In the travel state the tank cover assembly is adapted to cover the open top of the tank body. This prevents any crop still present in the storage tank from spilling over the top edge of circumferential wall of the tank body. In addition, the total height of the agricultural harvester in the travel state will generally be less than in the operational state, which makes it easier to move through traffic on public roads. In the operational state the tank cover assembly is adapted to provide an upward extension of the circumferential wall of the tank body. This upward extension provides an additional volume in which harvested crop can be accommodated.

The tank cover assembly comprises a panel assembly and a cover actuator assembly. The panel assembly extends along the top edge of the circumferential wall of the tank body, desirably along the entire top edge of the circumferential wall of the tank body. The panel assembly comprises a fabric wall element which is moveably, e.g. pivotally, connected to the tank body.

In the operational state of the tank cover assembly, the fabric wall element provides an upward extension of at least one of the front wall part, rear wall part, and/or the side wall parts of the circumferential wall of the tank body. In the travel state, the fabric wall element covers at least a part of the open top of the tank body. The fabric wall element comprises a rigid area.

To provide the upward extension of the circumferential wall, the fabric wall element extends from the top edge of the circumferential wall in an upward direction. The fabric wall element may for example extend in a direction between 20° and 90° upwardly relative to the horizontal, optionally between 30° and 90° upwardly relative to the horizontal, optionally between 45° and 90° upwardly relative to the horizontal. Optionally, the fabric wall element extends under a direction relative to the horizontal which is the same as the direction under which the front wall part, rear wall part, and/or the side wall part of the circumferential wall to which the fabric wall element provides an upward extension extends relative to the horizontal.

The fabric wall element has a reduced weight as compared to known rigid cover panels which are made of metal or rigid plastics. Therewith, the overall weight of the tank cover assembly and of the agricultural harvester, in accordance with aspects of the present invention, in general are reduced as compared to known tank cover assemblies and agricultural harvesters.

Examples of suitable fabric materials are polypropylene, aramid, cotton, bio based materials as hemp, flax, and wheat straw.

The tank cover assembly further comprises a cover actuator assembly. The cover actuator assembly comprises at least one cover actuator that is adapted to bring the tank cover assembly from the travel state into the operational state and vice versa. The cover actuator assembly is adapted to move the fabric wall element relative to the tank body during the movement from the travel state into the operational state and vice versa and at least during said movement, and to engage said fabric wall element at the rigid area. So, the cover actuator assembly engages the panel assembly at the fabric wall element when bringing the tank cover assembly from the travel state into the operational state and when bringing the tank cover assembly from the operational state into the travel state. Moving the fabric wall element relative to the tank body during the movement from the travel state into the operational state and vice versa, for example, involves pivoting the fabric wall element relative to the tank body or folding the fabric wall.

In a possible embodiment, the fabric wall element of the panel assembly extends along the entire top edge of the circumferential wall of the tank body.

Optionally, in the operational state the fabric wall element provides an upward extension of the front wall part, rear wall part and the side wall parts of the circumferential wall of the tank body.

Optionally, the fabric wall element further comprises corner elements. These corner elements are made of fabric. A first corner element extends between the part of the fabric wall element that provides an extension of the front wall part and the part of the fabric wall element that provides an extension of a side wall part. A second corner element extends between the part of the fabric wall element that provides an extension of the front wall part and the part of the fabric wall element that provides an extension of the other side wall part. A third corner element extends between the part of the fabric wall element that provides an extension of the rear wall part and the part of the fabric wall element that provides an extension of a side wall part. A fourth corner element extends between the part of the fabric wall element that provides an extension of the rear wall part and the part of the fabric wall element that provides an extension of the other side wall part.

Optionally, in this embodiment, the panel assembly comprises just a single fabric wall element. Optionally, in this embodiment, the fabric wall element is loop-shaped or funnel shaped, optionally a seamless loop-shaped or funnel shaped fabric wall element.

In a possible, alternative, embodiment, the panel assembly comprises a plurality of fabric wall elements, of which at least one wall element has a rigid area. The cover actuator assembly is adapted to, at least during the movement from the travel state into the operational state and vice versa, engage said fabric wall element at said rigid area. The fabric wall elements may be connected to each other, either directly or indirectly. Optionally, in this embodiment, at least two fabric wall elements comprise a rigid area and the cover actuator assembly is adapted to, at least during the movement from the travel state into the operational state and vice versa, engage said two fabric wall elements at said rigid area. Optionally, in this embodiment, all wall elements in the panel assembly are fabric wall elements. Alternatively, the panel assembly comprises fabric wall elements and wall elements of other materials.

In a possible embodiment, the fabric wall element comprises at least two rigid areas, and the cover actuator assembly is adapted to, at least during the movement from the travel state into the operational state and vice versa, engage said fabric wall element at said two rigid areas. Optionally, in this embodiment, the fabric wall element assembly extends along the entire top edge of the circumferential wall of the tank body. Optionally, in this embodiment, the panel assembly comprises just a single fabric wall element. Optionally, in this embodiment, the fabric wall element is loop-shaped or funnel shaped, optionally a seamless loop-shaped or funnel shaped fabric wall element.

In a possible embodiment, the fabric of the fabric wall element is a woven fabric, and the woven fabric comprises a warp direction and a weft direction, and the warp direction or the weft direction is substantially horizontal. This way, at least one main thread direction (i.e. the warp direction or the weft direction) extends in the direction in which the mechanical load exerted by the harvested crop in the additional volume created by the tank cover assembly in the operational state is the largest. This is advantageous for the load bearing capacity of the panel assembly.

In a possible embodiment, the fabric of the fabric wall element is seamless. This is advantageous for the load bearing capacity of the fabric wall element.

In a possible embodiment, the fabric is a distance fabric, a multilayer fabric, a tubular fabric, or a combination of these. A distance fabric is a type of fabric that has yarns or fibres extending away from the plane defined by the width and length of the fabric. In a tubular fabric, the fabric contains tube-like sections that extend over the width or length of the fabric. Distance fabrics, multilayer fabrics, and tubular fabrics all have a thickness that is larger than the thickness of ordinary fabrics. For example, the thickness of a distance fabric or a multilayer fabric or a tubular fabric is at least 5 mm, optionally between 5 mm and 50 mm.

In a possible embodiment, the rigid area of the fabric wall element comprises resin-reinforced fabric. In this embodiment, the rigid area can for example be obtained by injecting resin into a part of the fabric of the fabric wall element. After hardening and/or curing of the resin, a rigid area is obtained at the location where the resin is injected. The combination of the resin and the fabric results in a light but strong and rigid composite material.

In a possible embodiment, the rigid area of the fabric wall element comprises fabric which is supported by a structural element of metal or a rigid plastic material. Optionally, the fabric which is supported by said structural element is in addition reinforced by resin which is locally injected into the fabric.

In a possible embodiment, at least a part of the fabric of the fabric wall element is transparent. Optionally, in this embodiment, the transparent part of the fabric wall element extends in a direction from the free edge of the fabric wall element to the top edge of the circumferential wall of the tank body. This allows to see the level of harvested crop in the additional volume that is created by the tank cover being in the operational state.

In a possible embodiment, the fabric wall element comprises a primary rigid area and a secondary rigid area, and the cover actuator assembly engages the primary rigid area. The secondary rigid area may be aimed at providing additional stability or rigidity to the fabric wall element, or to provide the possibility to connect a further part of the agricultural harvester to the fabric wall element. Optionally, the secondary rigid area is elongate or generally U-shaped.

In a possible embodiment, the panel assembly comprises a further fabric wall element which is arranged spaced apart from the cover actuator assembly, also during the movement from the travel state into the operational state and vice versa, which further fabric wall element has a rigid area which is spaced apart from the cover actuator assembly.

So, in this embodiment, the panel assembly comprises at least one fabric wall element, which provides an upward extension of at least one of the front wall part, the rear wall part, and/or the side wall parts of the circumferential wall of the tank body, and in the travel state, covers at least a part of the open top of the tank body. This fabric wall element comprises at least one rigid area, and the cover actuator assembly engages this fabric wall element at this rigid area at least during the movement from the travel state into the operational state and vice versa.

In addition, in this embodiment a further fabric wall element is provided. This further fabric wall element is not engaged by the cover actuator assembly, also not during the movement from the travel state into the operational state and/or vice versa. The further fabric wall element is preferably connected, either directly or indirectly, to the fabric wall element that is engaged by the cover actuator assembly, so that the further fabric wall element moves along with the fabric wall element that is engaged by the cover actuator assembly when the tank cover assembly is moved from the travel state to the operational state or vice versa.

The further fabric wall element may comprise a rigid area, which is for reasons of clarity indicated as a "secondary rigid area". This secondary rigid area may be aimed at providing additional stability or rigidity to the further fabric wall element, or to provide the possibility to connect a further part of the agricultural harvester to the further fabric wall element. Optionally, the secondary rigid area is elongate or generally U-shaped.

In a possible embodiment, the circumferential wall of the tank body comprises fabric. For example, the circumferential wall is partly made of fabric, optionally resin-reinforced fabric, resin-reinforced distance fabric, resin-reinforced multilayer fabric, resin-reinforced tubular fabric, or a combination of these.

In accordance with yet another aspect of the present invention, the tank cover assembly as used in an agricultural harvester is used as a holder cover assembly for a holder of a vehicle. The vehicle can for example be a truck or a trailer.

In accordance with still another aspect of the present invention, there is provided a vehicle comprising a holder which is adapted to accommodate goods to be transported. The holder comprises a holder body having a bottom, an open top, and a circumferential wall having a top edge that delimits said open top. The circumferential wall comprises a front wall part, a rear wall part, and two side wall parts, which side wall parts are located on opposite sides of the circumferential wall. The holder further comprises a holder cover assembly, which holder cover assembly has a travel state and an loading state. In the travel state the holder cover assembly is adapted to cover the open top of the holder body and in the loading state the holder cover assembly is adapted to provide an upward extension of the circumferential wall of the holder body. The holder cover assembly comprises a panel assembly and a cover actuator assembly. The panel assembly extends along the top edge of the circumferential wall of the holder body and comprises a fabric wall element which is moveably connected to the holder body. In the loading state, the fabric wall element provides an upward extension of at least one of the front wall part, rear wall part, and/or the side wall parts of the circumferential wall of the holder body. In the travel state, the fabric wall element covers at least a part of the open top of the holder body. The fabric wall element comprises a rigid area. The cover actuator assembly comprises at least one cover actuator that is adapted to bring the holder cover assembly from the travel state into the loading state and vice versa. The cover actuator assembly is adapted to move the fabric wall element relative to the holder body during the movement from the travel state into the loading state and vice versa and, at least during said movement, to engage said fabric wall element at the rigid area.

The embodiments and options described above in relation to the agricultural harvester can also applied to a vehicle in accordance with the aspect of the invention described above.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

Figure 1:
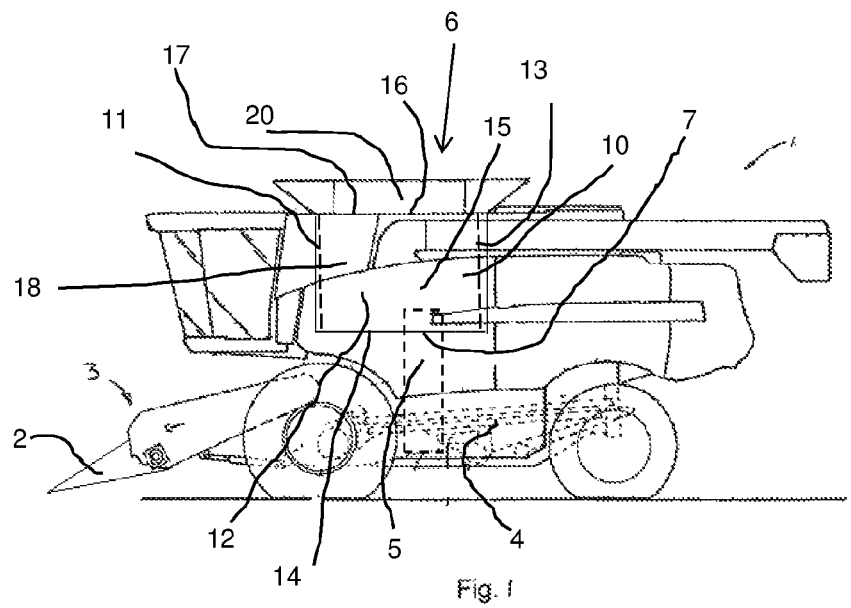
FIG. 1 illustrates an agricultural harvester comprising a storage tank comprising a tank body and a tank cover assembly, in accordance with an exemplary embodiment of the present invention.

FIG. 1 illustrates an agricultural harvester 1, in accordance with an exemplary embodiment of the present invention. In the example of FIG. 1, the agricultural harvester 1 is a combine harvester, but it is to be understood that the agricultural harvester 1 is not so limited. For example, the agricultural harvester 1 may be a harvester that harvests corn plants and chops up the plants and cobs for use as animal fodder.

The agricultural harvester 1 comprises a header 2 which is adapted to separate the crop to be harvested from the field. For example, the header 2 may comprise a cutter that cuts stalks of corn plants, grain plants, or other plants, in particular seed bearing plants or kernel bearing plants. When the agricultural harvester 1 is adapted for harvesting corn kernels, the header 2 may further comprise a cob separator device, which separates the corn cobs from the stalk of the corn plant.

The agricultural harvester 1 as shown in FIG. 1 further comprises a feeder device 3. The feeder device 3 is adapted to receive the harvested crop from the header 2. The feeder device 3 conveys the harvester crop further into the agricultural harvester 1. The feeder device 3 for example comprises a conveyor, e.g., a belt conveyor.

In the embodiment of FIG. 1, the agricultural harvester 1 comprises a processing unit 4. The processing unit 4 is adapted to process the harvested crop, e.g., by threshing and/or sieving.

From the processing unit 4, the harvested and processed crop is transported to a storage tank 6 by a crop storage feed device 5. The crop storage feed device 5 brings the harvested and processed crop into the storage tank 6 via a crop inlet 7. The crop storage feed device 5 can for example be a bubble-up auger. In an alternative embodiment, the agricultural harvester 1 does not comprise a processing unit 4, and the harvested crop is transferred directly from the feeder device 3 to the crop storage feed device 5.

The storage tank 6 comprises a tank body 11 and a tank cover assembly 20. The tank body 10 comprises a bottom 14, an open top 16, and a circumferential wall 18. The circumferential wall 18 has a top edge 17 that delimits the open top 16. The circumferential wall 18 further has a front wall part 11, a rear wall part 13, and two side wall parts 12, which side wall parts 12 are located on opposite sides of the circumferential wall 18.

The tank cover assembly 20 has a travel state and an operational state. FIG. 1 shows the tank cover assembly in its operational state. In the operational state, the tank cover assembly 20 is adapted to provide an upward extension of the circumferential wall 18 of the tank body 10. In the travel state, the tank cover assembly 20 is adapted to cover the open top 16 of the tank body 10.

In operation, the storage tank 6 is filled with harvested crop. Periodically, the storage tank 6 is emptied by transferring the harvested crop to, e.g., a truck or a trailer drawn by a tractor.

Figures 2A, 2B:
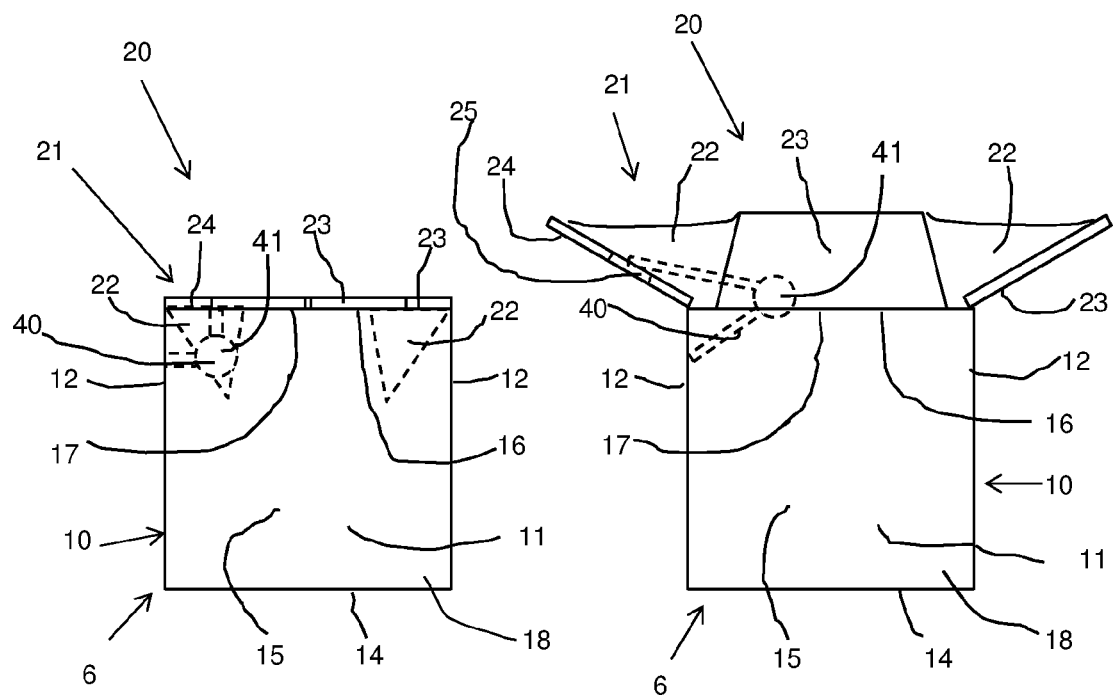
FIG. 2A illustrates a first embodiment of the tank cover assembly of FIG. 1 in a travel state, seen from the front, in accordance with an exemplary embodiment of the present invention.
FIG. 2B illustrates the first embodiment of the tank cover assembly of FIG. 2A in an operational state, seen from the front, in accordance with an exemplary embodiment of the present invention.

FIG. 2A illustrates the storage tank 6 and specifically a first exemplary embodiment of the tank cover assembly 20, seen from the front, in accordance with an exemplary embodiment of the present invention. In the view illustrated in FIG. 2A, the tank cover assembly 20 is in the travel state.

With reference to FIG. 2A, the storage tank 6 comprises a tank body 11 and an exemplary embodiment of the tank cover assembly 20. The tank body 10 comprises a bottom 14, an open top 16, and a circumferential wall 18. The circumferential wall 18 has a top edge 17 that delimits the open top 16. The circumferential wall 18 further has a front wall part 11, a rear wall part 13 (not visible in FIG. 2A), and two side wall parts 12, which side wall parts 12 are located on opposite sides of the circumferential wall 18.

The storage tank 6 further comprises a panel assembly 21 and a cover actuator assembly 40. In the example shown in FIG. 2A and FIG. 2B the cover actuator assembly 40 is mainly arranged inside the storage tank 6, but in an alternative embodiment the cover actuator assembly 40 can be arranged outside the storage tank 6. The cover actuator assembly 40 comprises at least one cover actuator 41 that is adapted to bring the tank cover assembly from 20 the travel state into the operational state and vice versa.

The panel assembly 21 extends along the top edge 17 of the circumferential wall 18 of the tank body 10. The panel assembly comprises at least at least one wall element 22, 23, 24 of which one is a fabric wall element 24 which is moveably, in this embodiment pivotably, connected to the tank body 10. In the embodiment shown in FIG. 2A and FIG. 2B, the panel assembly comprises one fabric wall element 24, three wall elements 23 made of metal, rigid plastic, rubber or fabric, and four corner elements 22. The corner elements 22 are flexible, and are made of fabric, flexible plastic, or rubber.

The fabric wall element 24 comprises a rigid area 25. The cover actuator assembly 40 engages the fabric wall element 24 at the rigid area 25. The cover actuator assembly 40 is adapted to move the fabric wall element 24 relative to the tank body 10 during the movement from the travel state into the operational state and vice versa.

In the embodiment shown in FIG. 2A and FIG. 2B, the cover actuator assembly 40 engages the fabric wall element 24 at the rigid area 25 all the time. In an alternative embodiment, the cover actuator assembly 40 only engages the fabric wall element 24 at the rigid area 25 during the movement from the travel state into the operational state and vice versa.

In the travel state, which is shown in FIG. 2A, the fabric wall element 23 covers at least a part of the open top 16 of the tank body 10. The wall elements 23, 24 together cover most of all of the open top 16 of the tank body 10. The corner elements 22 hang downwardly into the storage tank 6.

FIG. 2B illustrates the first exemplary embodiment of the tank cover assembly 20 in the operational state, seen from the front, in accordance with an exemplary embodiment of the present invention. In the operational state, the tank cover assembly 20 is adapted to provide an upward extension of the circumferential wall 18 of the tank body 10.

In the operational state, the fabric wall element 24 provides an upward extension of, in this example, one of the side wall parts 12 of the circumferential wall 18 of the tank body 10. The wall elements 23 provide an upward extension of the other side wall part 12, the front wall part 11, and the rear wall part 13 of the circumferential wall 18. The wall elements 23 may be of metal (e.g. aluminum), rigid plastic, rubber, or fabric. This upward extension of front wall part 11, two side wall parts 12, and the rear wall part 13 of the circumferential wall 18 by the wall elements 23, 24 in combination with the presence of the corner elements 22 provides an additional volume in which harvested crop can be accommodated. Therewith, the storage capacity of the storage tank 6 is increased.

Figure 3:
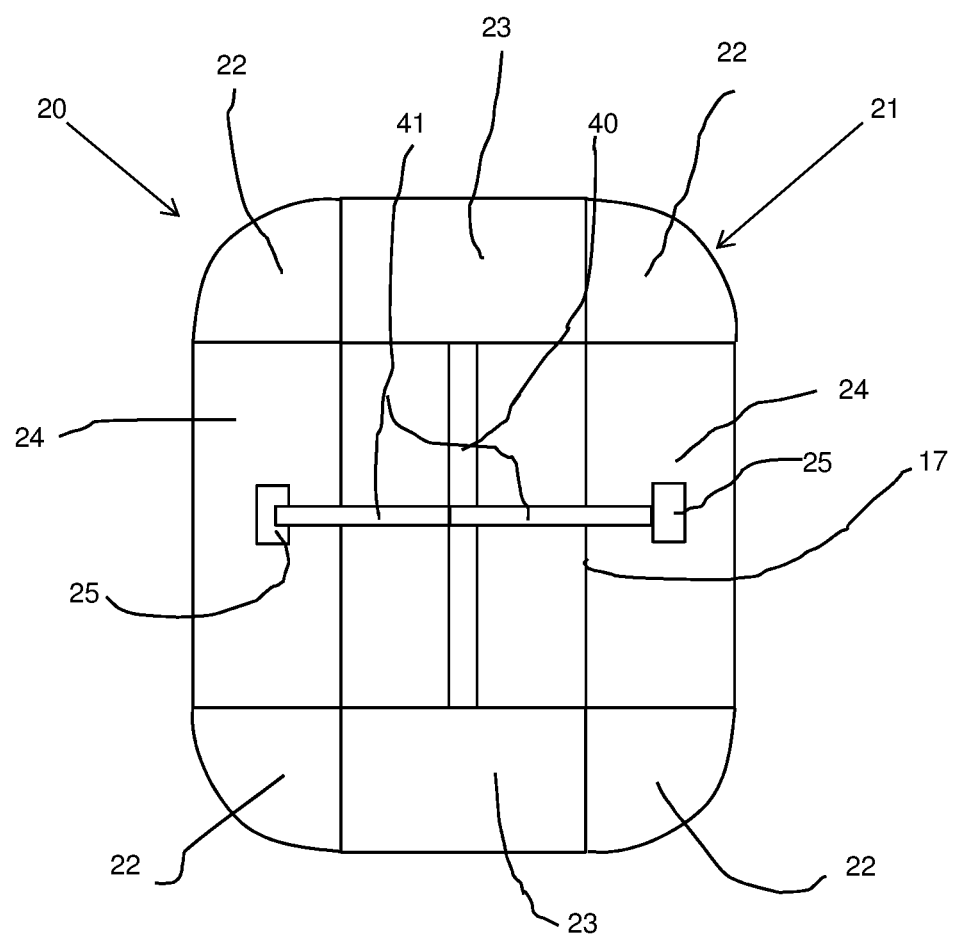
FIG. 3 illustrates a second embodiment of the tank cover assembly of FIG. 1 in an operational state, seen from above, in accordance with an exemplary embodiment of the present invention.

FIG. 3 illustrates a second exemplary embodiment of the tank cover assembly 20, seen from above, in accordance with an exemplary embodiment of the present invention. The embodiment of the tank cover assembly 20 of FIG. 3 is similar to the embodiment of the tank cover assembly 20 of FIGS. 2A and 2B and includes the features thereof, except as otherwise described below.

In the embodiment of FIG. 3, the panel assembly 21 comprises two fabric wall elements 24. These two fabric wall elements 24 are pivotably connected to the top edge 17 of the circumferential wall of the tank body, in the area of the side wall parts 12. The other wall parts 23 may also be of fabric, but alternatively they are made of metal (e.g., aluminum), rigid plastic, or rubber.

In this embodiment, each of the two fabric wall elements 24 comprises a rigid area 24. The cover actuator assembly 40 comprises, in this embodiment, two cover actuators 41, which are adapted to engage the two fabric wall elements 24 at their respective rigid areas 25, at least during the movement from the travel state into the operational state and vice versa.

If one or more of the wall elements 23 are made of fabric, they optionally comprise a secondary rigid area which is not engaged by the cover assembly actuator 40, also not engaged by the cover assembly actuator 40 also during the movement from the travel state into the operational state and vice versa.

Figure 4:
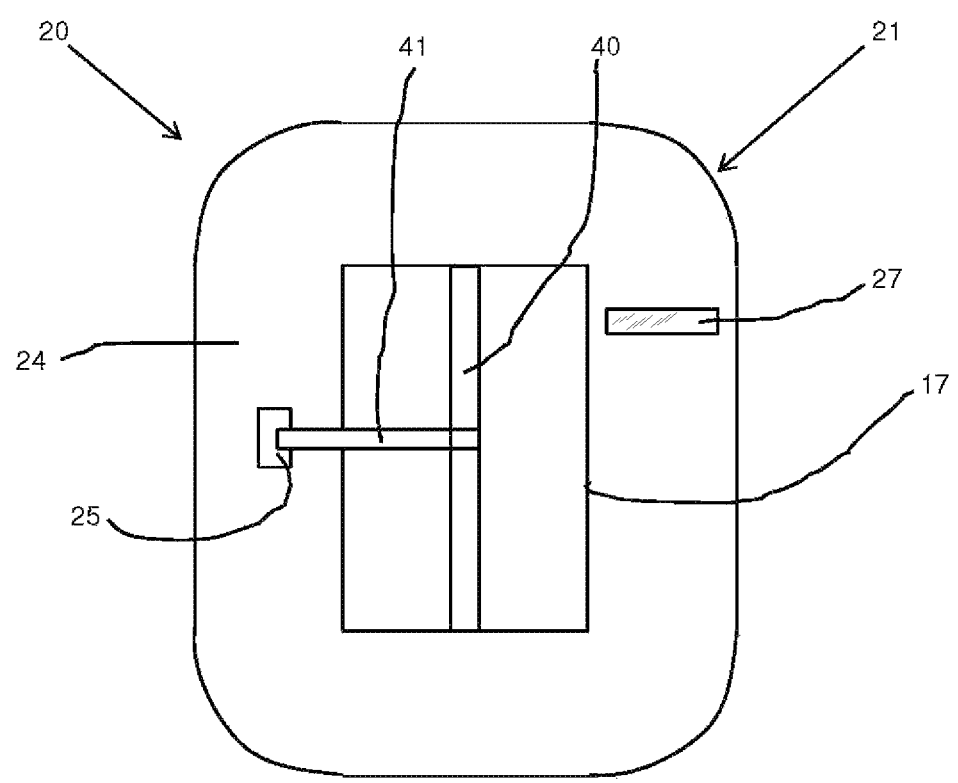
FIG. 4 illustrates a third embodiment of the tank cover assembly of FIG. 1, seen from above, in accordance with an exemplary embodiment of the present invention.

FIG. 4 illustrates a third exemplary embodiment of the tank cover assembly 20, seen from above, in accordance with an exemplary embodiment of the present invention. As illustrated, the embodiment of the tank cover assembly 20 illustrated in FIG. 4 is in the operational state. The embodiment of the tank cover assembly 20 of FIG. 4 is similar to the embodiment of the tank cover assembly 20 of FIGS. 2A and 2B and includes the features thereof, except as otherwise described below.

In this embodiment, there is only a single wall element in the panel assembly 21. This single wall element is a fabric wall element 24. The single fabric wall element 24 extends along the entire top edge 17 of the circumferential wall 18 of the tank body 10. The single wall element 24 provides, in the operational state, an extension of the front wall part 11, the rear wall part 13, and both side wall parts 12 of the circumferential wall 18, and also includes the four corner areas 22 between the extensions 24.

In the embodiment of FIG. 3, the fabric wall element 24 comprises a single rigid area 25 onto which the cover actuator assembly 40 engages at least during the movement from the travel state into the operational state and vice versa. In an alternative embodiment, the fabric wall element 24 comprises at least two rigid areas 25, and the cover actuator assembly 40 is adapted to engage the fabric wall element 24 at at least two of those rigid areas 25, at least during the movement from the travel state into the operational state and vice versa.

In the embodiment of FIG. 4, optionally the fabric wall element 24 comprises a transparent part 27. Such a transparent part can also be applied in the other embodiments which are shown. In the embodiment of FIG. 4, the transparent part 27 of the fabric wall element 24 extends in a direction from a free edge 28 of the fabric wall element 24 to the top edge 17 of the circumferential wall 18 of the tank body 10. This way, one can see the harvested crop fill level within the panel assembly 21 from outside the tank cover assembly 20.

Figure 5:
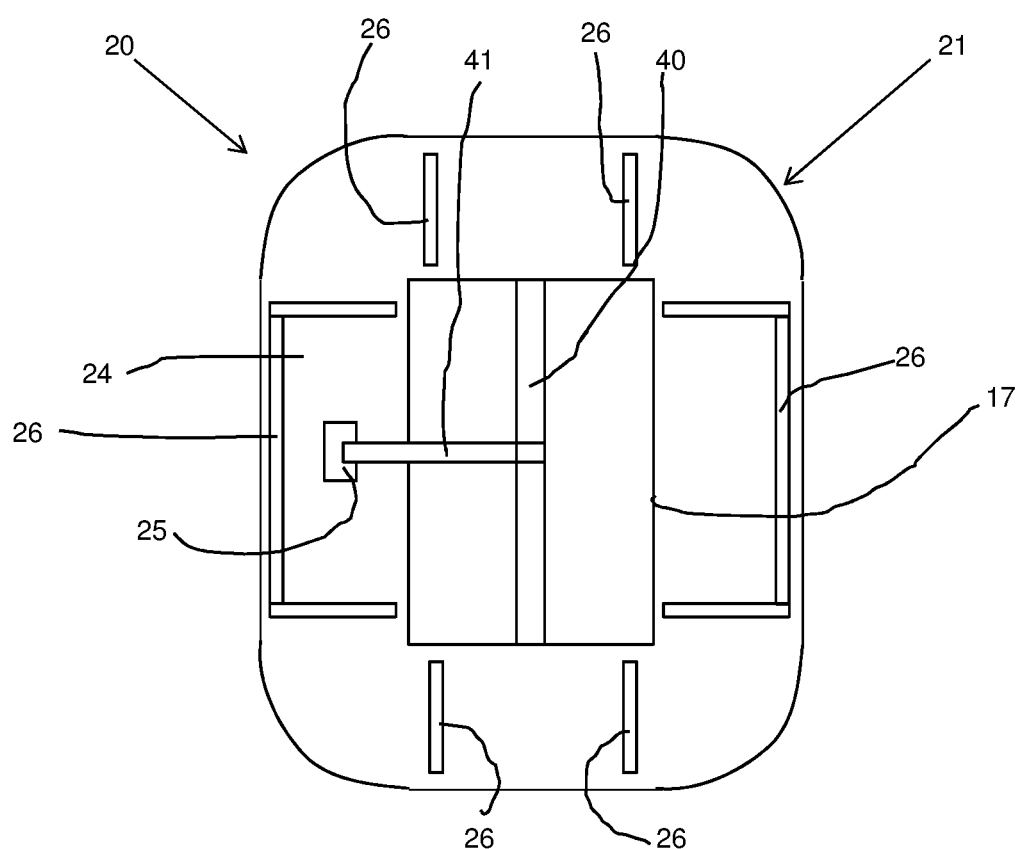
FIG. 5 illustrates a fourth embodiment of the tank cover assembly of FIG. 1, seen from above, in accordance with an exemplary embodiment of the present invention.

FIG. 5 illustrates a fourth embodiment of the tank cover assembly 20, seen from above, in accordance with an exemplary embodiment of the present invention. As illustrated, the embodiment of the tank cover assembly 20 illustrated in FIG. 5 is in the operational state. The embodiment of the tank cover assembly 20 of FIG. 5 is similar to the embodiment of the tank cover assembly 20 of FIGS. 2A and 2B and includes the features thereof, except as otherwise described below.

In this embodiment, the fabric wall element 24 comprises a primary rigid area 25 and multiple secondary rigid areas 26. The cover actuator assembly 40 engages the fabric wall element 24 at the primary rigid area 25. The secondary rigid areas 26 are, in this embodiment, elongate or generally U-shaped, but additionally or alternatively, other shapes are also possible. The secondary rigid areas 26 may be aimed at providing additional stability or rigidity to the fabric wall element 24, or to provide the possibility to connect a further part of the agricultural harvester to the fabric wall element 24.

The secondary rigid areas 26 are not engaged by the cover assembly actuator 40, and they are also not engaged by the cover assembly actuator 40 also during the movement from the travel state into the operational state and vice versa.

Figure 6:
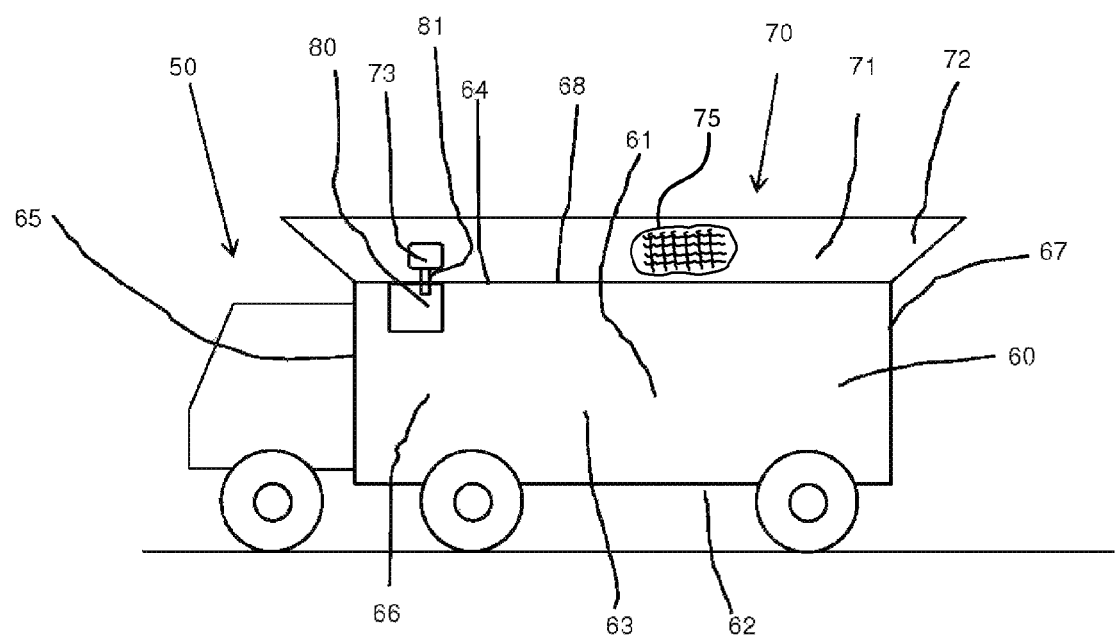
FIG. 6 illustrates vehicle comprising a holder comprising a holder body and a holder cover assembly, in accordance with an exemplary embodiment of the present invention.

FIG. 6 illustrates a holder cover assembly for a holder of a vehicle 50, seen from the side, in accordance with an exemplary embodiment of the present invention. In the example shown in FIG. 6, the vehicle 50 is a truck. The truck 50 comprises a holder 60 and a holder cover assembly 70. The holder 60 comprises a holder body 61.

The holder cover assembly 70 has a travel state and a loading state. FIG. 6 shows the holder cover assembly 70 in the loading state. In the travel state, the holder cover assembly 70 is adapted to cover the open top 64 of the holder body 61. In the loading state, the holder cover assembly 70 is adapted to provide an upward extension of the circumferential wall 63 of the holder body 61.

The holder 60 can have the same or similar features as the storage tank 6 of the agricultural harvester 1. The loading state can have the same or similar features as the operational state of the agricultural harvester 1. The holder 60 is adapted to accommodate goods to be transported.

The holder 60 comprises a holder body 61 and a holder cover assembly 70. The holder body 61 has a bottom 62, an open top 64, and a circumferential wall 63 having a top edge 68 that delimits said open top. The circumferential wall 63 comprises a front wall part 65, a rear wall part 67, and two side wall parts 66, which side wall parts are located on opposite sides of the circumferential wall 63. The holder cover assembly 70 has a travel state and a loading state. In the travel state the holder cover assembly 70 is adapted to cover the open top of the holder body 61, and in the loading state the holder cover assembly 70 is adapted to provide an upward extension of the circumferential wall 63 of the holder body 61.

The holder cover assembly 70 comprises a panel assembly 71 and a cover actuator assembly 80. The panel assembly 71 extends along the top edge 68 of the circumferential wall 63 of the holder body 61 and comprises a fabric wall element 72 which is moveably connected to the holder body 61.

In the loading state, the fabric wall element 72 provides an upward extension of at least one of the front wall part 65, the rear wall part 67, and/or the side wall parts 66 of the circumferential wall 63 of the holder body 61. In the travel state, the fabric wall element 72 covers at least a part of the open top of the holder body 61. The fabric wall element comprises a rigid area 73.

The cover actuator assembly 80 comprises at least one cover actuator 81 that is adapted to bring the holder cover assembly 70 from the travel state into the loading state and vice versa, wherein the cover actuator assembly 70 is adapted to move the fabric wall element 72 relative to the holder body 61 during the movement from the travel state into the loading state and vice versa and, at least during said movement, to engage said fabric wall element 72 at the rigid area 73.

Other exemplary embodiments of the holder cover assembly 70, analogous to the various exemplary embodiments of the tank cover assembly 20 described above, are contemplated. Specifically, the holder cover assembly 70 may be modified as the tank cover assembly 20 of FIGS. 2A and 2B is modified in FIGS. 3-5. Accordingly, the description above of the tank cover assembly 20 of FIGS. 3-5 is incorporated into the description of FIG. 7 to describe exemplary alternative embodiments of the holder cover assembly 70. Various features of these exemplary alternative embodiments of the holder cover assembly 70 are described below. Where reference numbers are not provided, it is understood that relevant reference numbers from FIGS. 3-5 pertain.

Optionally, in the vehicle 50, the fabric wall element 72 of the panel assembly 71 extends along the entire top edge of the circumferential wall 63 of the holder body 61.

Optionally, in the vehicle 50, the fabric wall element 72 comprises at least two rigid areas 73, and the cover actuator assembly 80 is adapted to, at least during the movement from the travel state into the loading state and vice versa, engage said fabric wall element 72 at said two rigid areas 73.

Optionally, in the vehicle 50, the panel assembly 71 comprises a plurality of fabric wall elements 72, and optionally at least two fabric wall elements 72 comprise a rigid area 73, and the cover actuator assembly 80 is adapted to, at least during the movement from the travel state into the loading state and vice versa, engage said two fabric wall elements 72 at said rigid area 73.

Optionally, in the vehicle 50, the fabric of the fabric wall element 72 is a woven fabric, shown schematically at 75, and the woven fabric comprises a warp direction and a weft direction, and the warp direction or the weft direction is substantially horizontal. Optionally, in the vehicle 50, the fabric of the fabric wall element 72 is seamless. Optionally, in the vehicle 50, the fabric is a distance fabric, a multilayer fabric, a tubular fabric, or a combination of these. A distance fabric is a type of fabric that has yarns or fibers extending away from the plane defined by the width and length of the fabric. In a tubular fabric, the fabric contains tube-like sections that extend over the width or length of the fabric. Distance fabrics, multilayer fabrics, and tubular fabrics all have a thickness that is larger than the thickness of ordinary fabrics. For example, the thickness of a distance fabric or a multilayer fabric or a tubular fabric is at least 5 mm, optionally between 5 mm and 50 mm.

Optionally, in the vehicle 50, the rigid area 73 of the fabric wall element 72 comprises resin-reinforced fabric. Optionally, in the vehicle 50, the rigid area 73 of the fabric wall element 72 comprises fabric which is supported by a structural element of metal or a rigid plastic material. Optionally, in the vehicle 50, at least a part of the fabric of the fabric wall element 72 is transparent, as in FIG. 4. Optionally, the transparent part of the fabric wall element 72 extends in a direction from the free edge of the fabric wall element 72 to the top edge of the circumferential wall 63 of the holder body 61.

Optionally, in the vehicle 50, the fabric wall element 73 comprises a primary rigid area and a secondary rigid area, as in FIG. 5, and wherein the cover actuator assembly 80 engages the primary rigid area. Optionally, the secondary rigid area is elongate or generally U-shaped.

Optionally, in the vehicle, the panel assembly 71 comprises a further fabric wall element, e.g., the fabric wall element 24 of FIG. 5, which is arranged spaced apart from the cover actuator assembly 80, also during the movement from the travel state into the loading state and vice versa, which further fabric wall element has a rigid area, e.g., the rigid area 26 of FIG. 5, which is spaced apart from the cover actuator assembly 80. Optionally, the secondary rigid area is elongate or generally U-shaped, as the rigid area 26 of FIG. 5.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. A storage tank for an agricultural harvester, the storage tank comprising:
   a tank body comprising a bottom, an open top, and a circumferential wall having a top edge that delimits the open top, the circumferential wall comprising a front wall part, a rear wall part, and two side wall parts, which side wall parts are located on opposite sides of the circumferential wall; and
   a tank cover assembly having a travel state and an operational state, the tank cover assembly displaceable to a first position to cover the open top of the tank body in the travel state, and the tank cover assembly displaceable to a second position to provide an upward extension of the circumferential wall of the tank body in the operational state, the tank cover assembly comprising:
      a panel assembly extending along the top edge of the circumferential wall of the tank body, the panel assembly comprising a fabric wall element which is moveably connected to the tank body, the fabric wall element comprising a rigid area, the fabric wall element:
         providing an upward extension of at least one of the front wall part, the rear wall part, and the side wall parts of the circumferential wall of the tank body in the operational state; and covering at least a part of the open top of the tank body in the travel state; and a cover actuator assembly comprising at least one cover actuator that is adapted to bring the tank cover assembly from the travel state into the operational state and vice versa, the cover actuator assembly positioned to move the fabric wall element relative to the tank body during movement from the travel state into the operational state and vice versa and at least, during the movement, to engage the fabric wall element at the rigid area.

2. The storage tank of claim 1, wherein the fabric wall element of the panel assembly extends along the entire top edge of the circumferential wall of the tank body.

3. The storage tank of claim 1, wherein the fabric wall element comprises at least two rigid areas, and wherein the cover actuator assembly is adapted to, at least during the movement from the travel state into the operational state and vice versa, engage the fabric wall element at the two rigid areas.

4. The storage tank of claim 1, wherein the panel assembly comprises a plurality of fabric wall elements, wherein optionally at least two of the plurality of fabric wall elements each comprises a rigid area, and wherein the cover actuator assembly is adapted to, at least during the movement from the travel state into the operational state and vice versa, engage the at least two fabric wall elements at their rigid areas.

5. The storage tank of claim 4, wherein the panel assembly further comprises a further fabric wall element which is arranged spaced apart from the cover actuator assembly, which further fabric wall element has a secondary rigid area which is spaced apart from the cover actuator assembly.

6. The storage tank of claim 1, wherein the fabric wall element is formed from a woven fabric, wherein the woven fabric comprises a warp direction and a weft direction, and wherein the warp direction or the weft direction is substantially horizontal.

7. The storage tank of claim 1, wherein the fabric wall element is formed from a seamless woven fabric.

8. The storage tank of claim 1, wherein the fabric wall element is formed from a woven fabric, and wherein the fabric is a distance fabric, a multilayer fabric, a tubular fabric, or a combination of these fabrics.

9. The storage tank of claim 1, wherein the rigid area of the fabric wall element comprises resin-reinforced fabric.

10. The storage tank of claim 1, wherein the rigid area of the fabric wall element comprises fabric which is supported by a structural element of metal or a rigid plastic material.

11. The storage tank of claim 1, wherein the fabric wall element comprises a transparent part.

12. The storage tank of claim 11, wherein the transparent part of the fabric wall element extends in a direction from a free edge of the fabric wall element to the top edge of the circumferential wall of the tank body.

13. The storage tank of claim 1, wherein the fabric wall element comprises a primary rigid area and a secondary rigid area, and wherein the cover actuator assembly engages the primary rigid area.

14. The storage tank of claim 13, wherein the secondary rigid area is elongate or generally U-shaped.

15. An agricultural harvester comprising:
a processing unit adapted to process a harvested crop;
a crop storage feed device adapted to receive and convey the harvested crop processed by the processing unit; and a storage tank for storing the conveyed harvested crop, the storage tank comprising:
a tank body comprising a bottom, an open top, and a circumferential wall having a top edge that delimits the open top, the circumferential wall comprising a front wall part, a rear wall part, and two side wall parts, which side wall parts are located on opposite sides of the circumferential wall; and a tank cover assembly having a travel state and an operational state, the tank cover assembly displaceable to a first position to cover the open top of the tank body in the travel state, and the tank cover assembly displaceable to a second position to provide an upward extension of the circumferential wall of the tank body in the operational state, the tank cover assembly comprising:
a panel assembly extending along the top edge of the circumferential wall of the tank body, the panel assembly comprising a fabric wall element which is moveably connected to the tank body, the fabric wall element comprising a rigid area, the fabric wall element:
providing an upward extension of at least one of the front wall part, the rear wall part, and the side wall parts of the circumferential wall of the tank body in the operational state; and
covering at least a part of the open top of the tank body in the travel state; and a cover actuator assembly comprising at least one cover actuator that is positioned to bring the tank cover assembly from the travel state into the operational state and vice versa, the cover actuator assembly adapted to move the fabric wall element relative to the tank body during movement from the travel state into the operational state and vice versa and at least, during the movement, to engage the fabric wall element at the rigid area.

16. The agricultural harvester of claim 15, wherein the fabric wall element of the panel assembly extends along the entire top edge of the circumferential wall of the tank body.

17. The agricultural harvester of claim 15, wherein the fabric wall element comprises at least two rigid areas, and wherein the cover actuator assembly is adapted to, at least during the movement from the travel state into the operational state and vice versa, engage the fabric wall element at the two rigid areas.

18. The agricultural harvester of claim 15, wherein the panel assembly comprises a plurality of fabric wall elements, wherein optionally at least two of the plurality of fabric wall elements each comprises a rigid area, and wherein the cover actuator assembly is adapted to, at least during the movement from the travel state into the operational state and vice versa, engage the at least two fabric wall elements at their rigid areas.

19. The agricultural harvester of claim 15, wherein the panel assembly further comprises a further fabric wall element which is arranged spaced apart from the cover actuator assembly, which further fabric wall element has a secondary rigid area which is spaced apart from the cover actuator assembly.

20. A vehicle for transporting goods, the vehicle comprising:
a holder body comprising a bottom, an open top, and a circumferential wall having a top edge that delimits the open top, the circumferential wall comprising a front wall part, a rear wall part, and two side wall parts, which side wall parts are located on opposite sides of the circumferential wall; and a holder cover assembly having a travel state and an operational state, the holder cover assembly adapted to cover the open top of the holder body in the travel state, and the holder cover assembly adapted to provide an upward extension of the circumferential wall of the holder body in the operational state, the holder cover assembly comprising:

a panel assembly extending along the top edge of the circumferential wall of the holder body, the panel assembly comprising a fabric wall element which is moveably connected to the holder body, the fabric wall element comprising a rigid area, the fabric wall element:

providing an upward extension of at least one of the front wall part, the rear wall part, and the side wall parts of the circumferential wall of the holder body in the operational state; and covering at least a part of the open top of the holder body in the travel state; and a cover actuator assembly comprising at least one cover actuator that is positioned to bring the holder cover assembly from the travel state into the operational state and vice versa, the cover actuator assembly adapted to move the fabric wall element relative to the holder body during movement from the travel state into the operational state and vice versa and at least, during the movement, to engage the fabric wall element at the rigid area.

* * * * *